(12) United States Patent
Zhao et al.

(10) Patent No.: US 10,904,724 B2
(45) Date of Patent: Jan. 26, 2021

(54) METHODS AND SYSTEMS FOR NAMING A PICK UP LOCATION

(71) Applicant: BEIJING DIDI INFINITY TECHNOLOGY AND DEVELOPMENT CO., LTD., Beijing (CN)

(72) Inventors: Ji Zhao, Beijing (CN); Fenglei Wang, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/743,052

(22) Filed: Jan. 15, 2020

(65) Prior Publication Data

US 2020/0154247 A1     May 14, 2020

Related U.S. Application Data

(63) Continuation of application No. PCT/CN2017/095979, filed on Aug. 4, 2017.

(51) Int. Cl.
*H04W 4/40* (2018.01)
*H04W 4/029* (2018.01)
*H04W 4/021* (2018.01)

(52) U.S. Cl.
CPC ............ *H04W 4/40* (2018.02); *H04W 4/021* (2013.01); *H04W 4/029* (2018.02)

(58) Field of Classification Search
CPC ....... H04W 4/029; H04W 4/02; H04W 4/024; H04W 4/40; G06Q 50/30; G06Q 10/02; G01C 21/3644; G01C 21/3682
See application file for complete search history.

(56) References Cited

U.S. PATENT DOCUMENTS 9,026,480 B2   5/2015   Popescu et al.
9,672,816 B1   6/2017   Chechik
(Continued)

FOREIGN PATENT DOCUMENTS

CA   2974452 A1   7/2016
CA   2975002 A1   8/2016
(Continued)

OTHER PUBLICATIONS

International Search Report in PCT/CN2017/095979 dated May 4, 2018, 4 pages.
(Continued)

*Primary Examiner* — Quoc Thai N Vu
(74) *Attorney, Agent, or Firm* — Metis IP LLC

(57) ABSTRACT

A method for naming a pickup location may include obtaining a location pair associated with a user from a terminal, the location pair including a current location and a pickup location. The method may also include determining a first and a second preliminary POIs based on the location pair and a target POI database. The method may further include determining a feature of the first preliminary POI and a feature of the second preliminary POI. The method may also include obtaining a trained naming model for naming a pickup location and determining a first score for the first preliminary POI and a second score for the second preliminary POI. The method may further include determining a final POI based on the first score and the second score, and determining a name of the pickup location based on the final POI.

19 Claims, 10 Drawing Sheets

(56) References Cited

U.S. PATENT DOCUMENTS

2016/0301664 A1   10/2016  Xie
2018/0033112 A1    2/2018  Wu et al.
2018/0340787 A1* 11/2018  Sheth ................. G01C 21/3476

FOREIGN PATENT DOCUMENTS

| CN | 101794307 A | 8/2010 |
|----|-------------|--------|
| CN | 101969451 A | 2/2011 |
| CN | 102142003 A | 8/2011 |
| CN | 103023977 A | 4/2013 |
| CN | 104703141 B | 6/2016 |
| CN | 105677804 A | 6/2016 |
| CN | 105701580 A | 6/2016 |
| CN | 106095915 A | 11/2016 |

OTHER PUBLICATIONS

Written Opinion in PCT/CN2017/095979 dated May 4, 2018, 4 pages.
Extended European Search Report in European Application No. 17920397.1 dated Apr. 24, 2020, 9 pages.
First Office Action in Chinese Application No. 201780093646.0 dated Oct. 29, 2020, 16 pages.

\* cited by examiner

METHODS AND SYSTEMS FOR NAMING A PICK UP LOCATION

CROSS-REFERENCE TO RELATED APPLICATIONS

This application is a Continuation of International Application No. PCT/CN2017/095979, filed on Aug. 4, 2017, the contents of which are expressly incorporated herein by reference in their entirety.

TECHNICAL FIELD

This application generally relates to machine learning, and in particular, to methods and systems for naming a pickup location using machine learning techniques.

BACKGROUND

Many location-based services and/or applications, such as web mapping services, navigation services, and online on-demand transportation services, may need name a pickup location to provide services. For example, for an on-demand transportation service, when the passenger set a pickup location, the driver need to know where the pickup location is. It is inconvenient for the driver to find the pickup location if only the longitude and latitude of the pickup location are provided. Thus it is desirable to name a pickup location that makes it easier for the driver to pick up the passenger.

SUMMARY OF THE INVENTION

In a first aspect of the present disclosure, a system is provided. The system may include at least one storage device storing a set of instructions and at least one processor in communication with the at least one storage device. When executing the set of instructions, the at least one processor may be configured to cause the system to: operate logical circuits in the at least one processor to obtain a location pair associated with an order, the location pair including a current location and a pickup location; operate the logical circuits in the at least one processor to determine a first preliminary point of interest (POI) and a second preliminary POI based on the location pair and a target POI database; operate the logical circuits in the at least one processor to determine a feature of the first preliminary POI based on the first preliminary POI and the location pair; operate the logical circuits in the at least one processor to determine a feature of the second preliminary POI based on the second preliminary POI and the location pair; operate the logical circuits in the at least one processor to obtain a trained naming model for naming a pickup location; operate the logical circuits in the at least one processor to determine a first score for the first preliminary POI based on the feature of the first preliminary POI and the trained naming model; operate the logical circuits in the at least one processor to determine a second score for the second preliminary POI based on the feature of the second preliminary POI and the trained naming model; operate the logical circuits in the at least one processor to determine a final POI based on the first score and the second score; and operate the logical in the at least one processor to determine a name of the pickup location based on the final POI.

In some embodiments, the first preliminary POI or the second preliminary POI may be within a first distance from the current location and within a second distance from the pickup location.

In some embodiments, the trained naming model may include an adaptive boosting model or a gradient boosting decision tree (GBDT) model.

In some embodiments, the trained naming model may be generated according to a process for training a naming model, the process including: obtaining a preliminary naming model; obtaining a plurality of training samples; training the preliminary naming model to obtain the trained naming model using the obtained plurality of training samples.

In some embodiments, the plurality of training samples may include at least one training sample that is generated according to a process for generating a training sample, the process including: determining historical order information related to a historical order; mapping a reference POI with the historical order information; determining a reference feature of the reference POI based on the historical order information; and generating the at least one training sample based on the reference feature of the reference POI and the historical order information.

In some embodiments, the historical order information may include at least one of historical location data, historical final pickup location data, historical recommended pickup location data, or a historical pickup location name.

In some embodiments, the historical order information may include historical pickup location name; and the determining the reference feature of the reference POI may further include mapping the historical order information to the reference POI based on similarity of name of the reference POI and the historical pickup location name of the historical order.

In some embodiments, the historical order information may include historical final pickup location data and historical recommended pickup location data; the reference feature of the reference POI may include relocation behavior data; and the determining the reference feature of the reference POI based on the historical order information may further include: obtaining the historical final pickup location data; obtaining the historical recommended pickup location data; and determining the relocation behavior data based on the historical final pickup location data and the historical recommended pickup location data.

In some embodiments, the target POI database may be determined based on a process for generating a POI database, the process including: obtaining a preliminary POI database, the preliminary POI database including the reference POI; and determining the target POI database based on an attribute of the reference POI.

In some embodiments, the determining the target POI database based on an attribute of the reference POI may further include: determining the target POI database based on the historical order information.

In another aspect of the present disclosure, a method implemented on a computing device having a processor, a storage medium and a communication platform connected to a network is provided. The method may include: obtaining, by the processor, a location pair associated with an order, the location pair including a current location and a pickup location; determining, by the processor, a first preliminary point of interest (POI) and a second preliminary POI based on the location pair and a target POI database; determining, by the processor, a feature of the first preliminary POI based on the first preliminary POI and the location pair; determining, by the processor, a feature of the second preliminary POI based on the second preliminary POI and the location pair; obtaining, by the processor, a trained naming model for naming a pickup location; determining, by the processor, a first score for the first preliminary POI based on the feature of the first preliminary POI and the trained naming model; determining, by the processor, a second score for the second preliminary POI based on the feature of the second preliminary POI and the trained naming model; determining, by the processor, a final POI based on the first score and the second score; and determining, by the processor, a name of the pickup location based on the final POI.

In some embodiments, the first preliminary POI or the second preliminary POI may be within a first distance from the current location and within a second distance from the pickup location.

In some embodiments, the trained naming model may include an adaptive boosting model or a gradient boosting decision tree (GBDT) model.

In some embodiments, the trained naming model may be generated according to a process for training a naming model, the process including: obtaining a preliminary naming model; obtaining a plurality of training samples; training the preliminary naming model to obtain the trained naming model using the obtained plurality of training samples.

In some embodiments, the plurality of training samples may include at least one training sample that is generated according to a process for generating a training sample, the process including: determining historical order information related to a historical order; mapping a reference POI with the historical order information; determining a reference feature of the reference POI based on the historical order information; and generating the at least one training sample based on the reference feature of the reference POI and the historical order information.

In some embodiments, the historical order information may include at least one of historical location data, historical final pickup location data, historical recommended pickup location data, or a historical pickup location name.

In some embodiments, the historical order information may include historical pickup location name; and the determining the reference feature of the reference POI may further include mapping the historical order information to the reference POI based on similarity of name of the reference POI and the historical pickup location name of the historical order.

In some embodiments, the historical order information may include historical final pickup location data and historical recommended pickup location data; the reference feature of the reference POI may include relocation behavior data; and the determining the reference feature of the reference POI based on the historical order information may further include: obtaining the historical final pickup location data; obtaining the historical recommended pickup location data; and determining the relocation behavior data based on the historical final pickup location data and the historical recommended pickup location data.

In some embodiments, the target POI database may be determined based on a process for generating a POI database, the process including: obtaining a preliminary POI database, the preliminary POI database including the reference POI; and determining the target POI database based on an attribute of the reference POI.

In yet another aspect of the present disclosure, a non-transitory computer readable medium, including at least one set of instructions for initiating a connection between a terminal and an on-demand transportation platform is provided. When executed by at least one processor of an electronic terminal, the at least one set of instructions may direct the at least one processor to perform acts of: obtaining a location pair associated with a user from a terminal, the location pair including a current location and a pickup location; determining a first preliminary point of interest (POI) and a second preliminary POI based on the location pair and a target POI database; determining a feature of the first preliminary POI based on the first preliminary POI and the location pair; determining a feature of the second preliminary POI based on the second preliminary POI and the location pair; obtaining a trained naming model for naming a pickup location; determining a first score for the first preliminary POI based on the feature of the first preliminary POI and the naming model; determining a second score for the second preliminary POI based on the feature of the second preliminary POI and the naming model; determining a final POI based on the first score and the second score; and determining a name of the pickup location based on the final POI.

In yet another aspect of the present disclosure, a system implemented on a computing device having a processor, a storage medium and a communication platform connected to a network is provided. The system may include: a location obtaining module configured to obtain a location pair, the location pair including a current location and a pickup location; a preliminary POI determination module configured to determine a first preliminary point of interest (POI) and a second preliminary POI based on the location pair and a target POI database; a feature extraction module configured to determine a feature of the first preliminary POI based on the first preliminary POI and the location pair; the feature extraction module further configured to determine a feature of the second preliminary POI based on the second preliminary POI and the location pair; a model obtaining module configured to obtain a trained naming model for naming a pickup location; the model obtaining module further configured to determine a first score for the first preliminary POI based on the feature of the first preliminary POI and the trained naming model; the model obtaining module further configured to determine a second score for the second preliminary POI based on the feature of the second preliminary POI and the trained naming model; a naming module configured to determine a final POI based on the first score and the second score; and the naming module further configured to determine a name of the pickup location based on the final POI.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

Figures herein are provided for further understanding of the present disclosure, and constitute a part of this present disclosure. The exemplary embodiments of the present disclosure and the description are used to explain the present disclosure, and not intended to be limiting. In the drawing, the like reference numerals denote the same parts.

DETAIL DESCRIPTION

Figure 1:
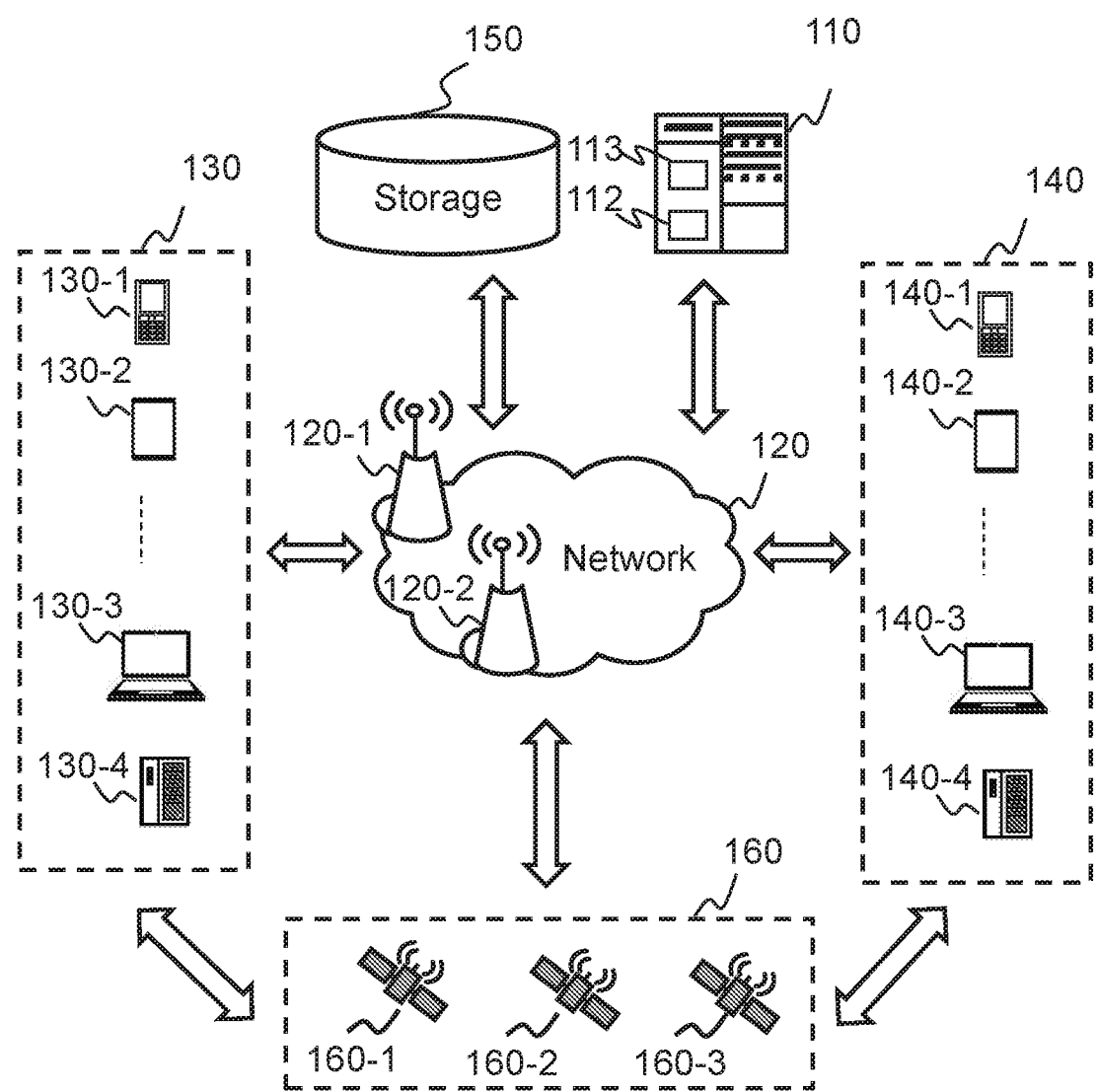
FIG. 1 is a block diagram of an exemplary system for on-demand transportation service according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this disclosure, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operations and functions of the related elements of structure, and the combination of parts and economies of manufacture, may become more apparent upon consideration of the following description with reference to the accompanying drawings, all of which form part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the systems and methods disclosed in the present disclosure are described primarily regarding naming a pickup location of an order, it should also be understood that this is only one exemplary embodiment. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high-speed rail, a subway, a vessel, an aircraft, a spaceship, a hot-air balloon, a driverless vehicle, or the like, or any combination thereof. The transportation system may also include any transportation system for management and/or distribution, for example, a system for transmitting and/or receiving an express. The application of the system or method of the present disclosure may include a web page, a plug-in of a browser, a client terminal, a custom system, an internal analysis system, an artificial intelligence robot, or the like, or any combination thereof.

The terms "passenger," "requester," "requestor," "service requester," "service requestor" and "customer" in the present disclosure are used interchangeably to refer to an individual, an entity, or a tool that may request or order a service. Also, the terms "driver," "provider," "service provider," and "supplier" in the present disclosure are used interchangeably to refer to an individual, an entity, or a tool that may provide a service or facilitate the providing of the service. The term "user" in the present disclosure may refer to an individual, an entity, or a tool that may request a service, order a service, provide a service, or facilitate the providing of the service. For example, the user may be a passenger, a driver, an operator, or the like, or any combination thereof. In the present disclosure, terms "passenger" and "passenger terminal" may be used interchangeably, and terms "driver" and "driver terminal" may be used interchangeably.

The terms "service," "request," and "service request" in the present disclosure are used interchangeably to refer to a request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable or free.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and methods for naming a pickup location of an order. The system may first obtain a location pair from a terminal or a storage associated with a service requester and then recall a number of point of interests (POIs) related to the location pair. The system may also obtain a trained naming model for naming a pickup location and determine one or more features for each of POIs. The system may further determine a score for each of the POIs based on the one or more features of each of POIs and rank the POIs based on the scores. The system may also determine a final POI from the POIs based on the ranking and determine the name of pickup location based on the final POI.

It should be noted that online on-demand transportation service, such as online taxi-hailing including taxi hailing combination services, is a new form of service rooted only in post-Internet era. It provides technical solutions to users and service providers that could raise only in post-Internet era. In the pre-Internet era, when a user hails a taxi on the street, the taxi request and acceptance occur only between the passenger and one taxi driver that sees the passenger. If the passenger hails a taxi through a telephone call, the service request and acceptance may occur only between the passenger and one service provider (e.g., one taxi company or agent). Online taxi, however, allows a user of the service to real-time and automatic distribute a service request to a vast number of individual service providers (e.g., taxi) distance away from the user. It also allows a plurality of service providers to respond to the service request simultaneously and in real-time. Therefore, through the Internet, the online on-demand transportation systems may provide a much more efficient transaction platform for the users and the service providers that may never meet in a traditional pre-Internet transportation service system. When the system receives an order from passenger, the system may name the pickup location of the order. According to the name of the pickup location, the driver may pick up the passenger more easily.

FIG. 1 is a block diagram of an exemplary on-demand service system 100 according to some embodiments of the present disclosure. For example, the on-demand service system 100 may be an online transportation service platform for transportation services such as taxi hailing service, chauffeur service, express car service, carpool service, bus service, driver hire, and shuttle service. The on-demand service system 100 may be an online platform including a server 110, a network 120, a requester terminal 130, a provider terminal 140, a storage 150 and a positioning system 160. The server 110 may include a processing engine 112 and/or a processing engine 113.

In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the requester terminal 130, the provider terminal 140, and/or the storage 150 via the network 120. As another example, the server 110 may connect to the requester terminal 130, the provider terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112 and/or a processing engine 113. The processing engine 112 and/or the processing engine 113 may process information and/or data relating to the service request to perform one or more functions of the server 110 described in the present disclosure. For example, the processing engine 112 may be configured to obtain a plurality of historical on-demand services and determine a name of a pickup location of an order. The processing engine 113 may be determine a trained name model for naming the pickup location of the order. In some embodiments, the processing engine 112 and/or a processing engine 113 may include one or more processing engines (e.g., single-core processing engine(s) or multi-core processor(s)). Merely by way of example, the processing engine 112 and/or a processing engine 113 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components of the on-demand service system 100 (e.g., the server 110, the requester terminal 130, the provider terminal 140, the storage 150, and the positioning system 160) may transmit information and/or data to other component(s) in the on-demand service system 100 via the network 120. For example, the server 110 may receive a service request from the requester terminal 130 via the network 120. In some embodiments, the network 120 may be any type of wired or wireless network, or combination thereof. Merely by way of example, the network 120 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information between them.

In some embodiments, a requester may be a user of the requester terminal 130. In some embodiments, the user of the requester terminal 130 may be someone other than the requester. For example, user A of the requester terminal 130 may use the requester terminal 130 to transmit a service request for user B, or receive service and/or information or instructions from the server 110. In some embodiments, a provider may be a user of the provider terminal 140. In some embodiments, the user of the provider terminal 140 may be someone other than the provider. For example, user C of the provider terminal 140 may user the provider terminal 140 to receive a service request for user D, and/or information or instructions from the server 110. In some embodiments, "requester" and "requester terminal" may be used interchangeably, and "provider" and "provider terminal" may be used interchangeably.

In some embodiments, the requester terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requester terminal 130 may be a device with positioning technology for locating the position of the requester and/or the requester terminal 130.

In some embodiments, the provider terminal 140 may be similar to, or the same device as the requester terminal 130. In some embodiments, the provider terminal 140 may be a device with positioning technology for locating the position of the provider and/or the provider terminal 140. In some embodiments, the requester terminal 130 and/or the provider terminal 140 may communicate with another positioning device to determine the position of the requester, the requester terminal 130, the provider, and/or the provider terminal 140. In some embodiments, the requester terminal 130 and/or the provider terminal 140 may transmit positioning information to the server 110.

The storage 150 may store data and/or instructions. In some embodiments, the storage 150 may store data obtained from the requester terminal 130 and/or the provider terminal 140. In some embodiments, the storage 150 may store data and/or instructions that the server 110 may execute or use to perform exemplary methods described in the present disclosure. For example, the storage 150 may store a plurality of historical order data associated with a certain district. The storage 150 may store a plurality of historical order information of an historical order. The storage 150 may store a preliminary POI database and/or a target POI database containing one or more reference POIs. The storage 150 may store one or more reference features of the reference POI. The storage 150 may store a preliminary naming model and/or a trained naming model for naming a pickup location. In some embodiments, the storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the on-demand service system 100 (e.g., the server 110, the requester terminal 130, the provider terminal 140). One or more components of the on-demand service system 100 may access the data or instructions stored in the storage 150 via the network 120. In some embodiments, the storage 150 may be directly connected to or communicate with one or more components of the on-demand service system 100 (e.g., the server 110, the requester terminal 130, the provider terminal 140). In some embodiments, the storage 150 may be part of the server 110.

The positioning system 160 may determine information associated with an object, for example, one or more of the requester terminal 130, the provider terminal 140, etc. The information may include a location, an elevation, a velocity, or an acceleration of the object, or a current time. For example, the positioning system 160 may determine a current location of the requester terminal 130. In some embodiments, the positioning system 160 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The location may be in the form of coordinates, such as latitude coordinate and longitude coordinate, etc. The positioning system 160 may include one or more satellites, for example, a satellite 160-1, a satellite 160-2, and a satellite 160-3. The satellites 160-1 through 160-3 may determine the information mentioned above independently or jointly. The satellite positioning system 160 may transmit the information to the network 120, the requester terminal 130, or the provider terminal 140 via wireless connections.

In some embodiments, one or more components of the on-demand service system 100 (e.g., the server 110, the requester terminal 130, the provider terminal 140) may access the storage 150. In some embodiments, one or more components of the on-demand service system 100 may read and/or modify information relating to the requester, provider, and/or the public when one or more conditions are met. For example, the server 110 may read and/or modify one or more users' information after a service. As another example, the provider terminal 140 may access information relating to the requester when receiving a service request from the requester terminal 130, but the provider terminal 140 may not modify the relevant information of the requester.

In some embodiments, information exchanging of one or more components of the on-demand service system 100 may be achieved by way of requesting a service. The object of the service request may be any product. In some embodiments, the product may be a tangible product or immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used on the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle), a car (e.g., a taxi, a bus, a private car), a train, a subway, a vessel, an aircraft (e.g., an airplane, a helicopter, a space shuttle, a rocket, a hot-air balloon), or the like, or any combination thereof.

One of ordinary skill in the art would understand that when an element of the on-demand service system 100 performs, the element may perform through electrical signals and/or electromagnetic signals. For example, when a service requester terminal 130 processes a task, such as making a determination, identifying or selecting an object, the requester terminal 130 may operate logic circuits in its processor to perform such task. When the service requester terminal 130 transmits out a service request to the server 110, a processor of the service requester terminal 130 may generate electrical signals encoding the request. The processor of the service requester terminal 130 may then transmit the electrical signals to an output port. If the service requester terminal 130 communicates with the server 110 via a wired network, the output port may be physically connected to a cable, which further transmit the electrical signal to an input port of the server 110. If the service requester terminal 130 communicates with the server 110 via a wireless network, the output port of the service requester terminal 130 may be one or more antennas, which convert the electrical signal to electromagnetic signal. Similarly, a service provider terminal 140 may process a task through operation of logic circuits in its processor, and receive an instruction and/or service request from the server 110 via electrical signal or electromagnet signals. Within an electronic device, such as the service requester terminal 130, the service provider terminal 140, and/or the server 110, when a processor thereof processes an instruction, transmits out an instruction, and/or performs an action, the instruction and/or action is conducted via electrical signals. For example, when the processor retrieves or saves data from a storage medium, it may transmit out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
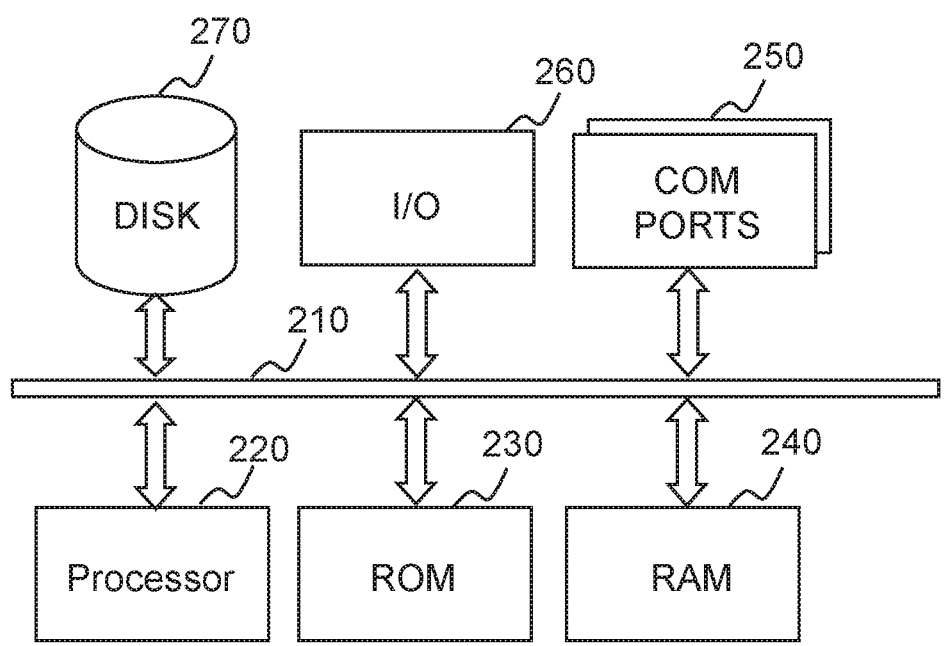
FIG. 2 is a block diagram of an exemplary computing device according to some embodiments of the present disclosure.

FIG. 2 is a schematic diagram illustrating exemplary hardware and software components of a computing device 200 on which the server 110, the requester terminal 130, and/or the provider terminal 140 may be implemented according to some embodiments of the present disclosure. For example, the processing engine 112 and/or a processing engine 113 may be implemented on the computing device 200 and configured to perform functions of the processing engine 112 and/or a processing engine 113 disclosed in this disclosure.

The computing device 200 may be a general-purpose computer or a special-purpose computer; both may be used to implement an on-demand system for the present disclosure. The computing device 200 may be used to implement any component of the on-demand service as described herein. For example, the processing engine 112 and/or a processing engine 113 may be implemented on the computing device 200, via its hardware, software program, firmware, or any combination thereof (e.g., processor 220).

The computing device 200, for example, may include COM ports 250 connected to and from a network connected thereto to facilitate data communications. The computing device 200 may also include a processor 220 for executing program instructions. The exemplary computing device may include an internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O 260, supporting input/output between the computer and other components therein. The computing device 200 may also receive programming and data via network communications.

Merely for illustration, only one processor is described in FIG. 2. Multiple processors are also contemplated; thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different processors jointly or separately in the computing device 200 (e.g., the first processor executes step A and the second processor executes step B or the first and second processors jointly execute steps A and B).

Figure 3:
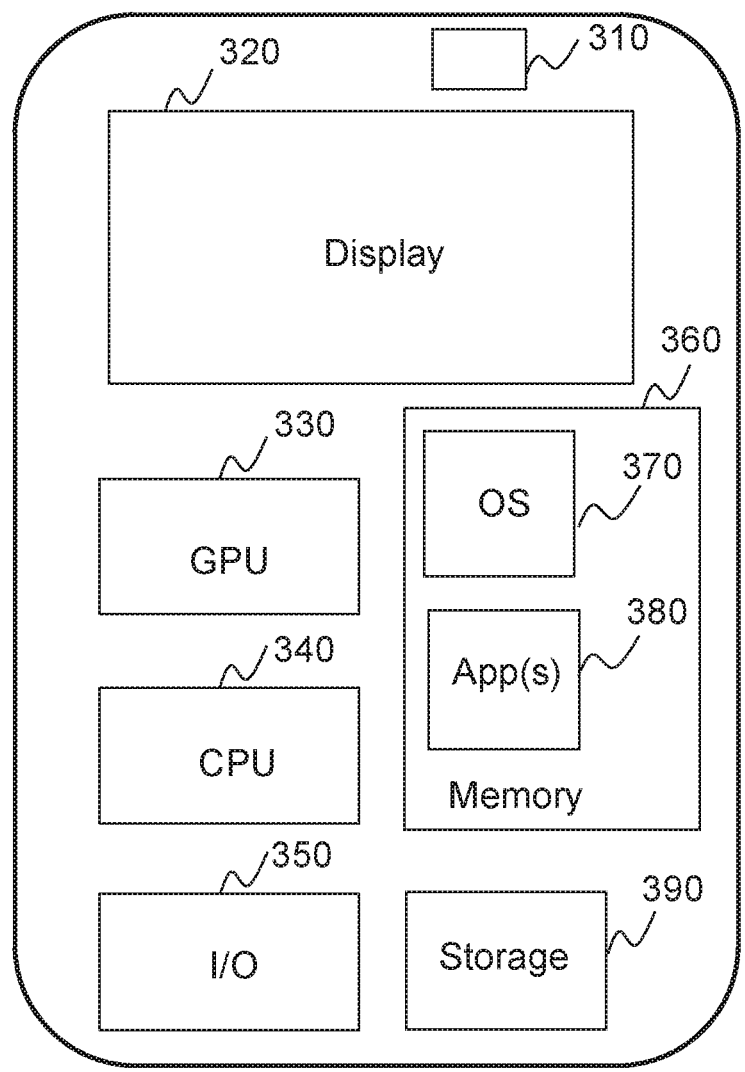
FIG. 3 is a schematic diagram illustrating an exemplary mobile device according to some embodiments of the present disclosure.

FIG. 3 is a schematic diagram illustrating exemplary hardware and/or software components of an exemplary mobile device 300 on which the requestor terminal 130 and/or the provider terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to an online on-demand transportation service or other information from the server 110, and transmitting information relating to an online on-demand transportation service or other information to the server 110. User interactions with the information stream may be achieved via the I/O 350 and provided to the server 110 and/or other components of the online on-demand transportation service system 100 via the network 120.

Figure 4A:
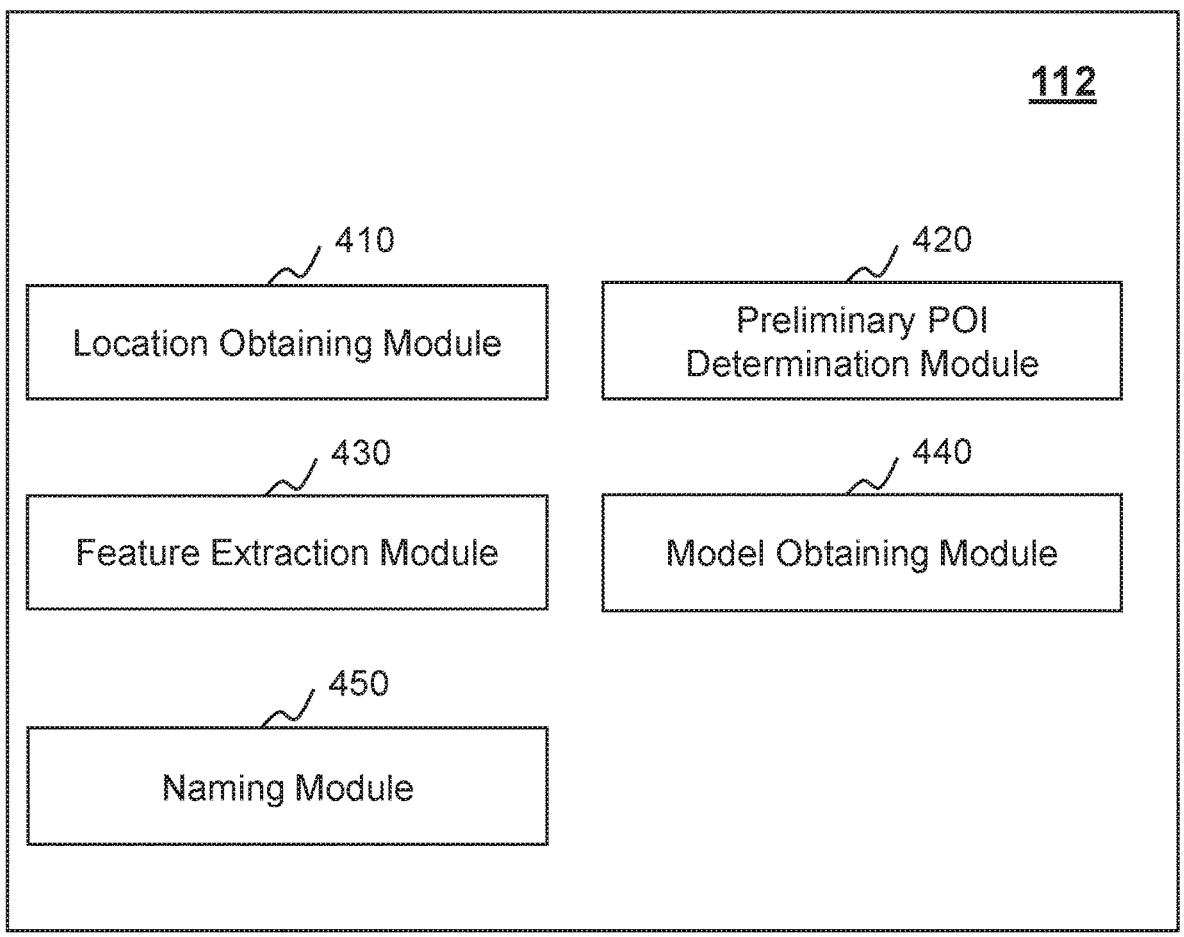
FIG. 4A is a block diagram of an exemplary processing engine for naming a pickup location of an order according to some embodiments of the present disclosure.

FIG. 4A is a block diagram of an exemplary processing engine 112 for naming a pickup location of an order according to some embodiments of the present disclosure. The processing engine 112 may be in communication with a computer-readable storage (e.g., a storage 150, a requester terminal 130, or a provider terminal 140), and may execute instructions stored in the computer-readable storage medium. In some embodiments, the processing engine 112 may include a location obtaining module 410, a preliminary POI determination module 420, a feature extraction module 430, a model obtaining module 440, and a naming module 450.

The location obtaining module 410 may obtain a location pair of an order. In some embodiments, the location pair may be associated with a user. The location pair may include a current location and a pickup location. The current location may be a location where the user initiates the order via the requester terminal 130. In some embodiments, the current location may include longitude data and/or latitude data of the current location. The pickup location may be a location that the user wants to be picked up by the service provider. The pickup location may include longitude data and/or latitude data of the pickup location. In some embodiments, the pickup location may be determined by the on-demand service system 100 as a recommended pickup location, which may be transmitted to the requester terminal 130 and the provider terminal 140. Alternatively, the pickup location may be inputted by the user via the requester terminal 130. Alternatively, the pickup location may be the current location of the user described above.

The preliminary point of interest (POI) determination module 420 may determine one or more preliminary points of interest (POIs) base on the location pair and a target POI database. The target POI database may include one or more reference POIs. In some embodiments, the target POI database may be generated according to process 900 illustrated in FIG. 9 and described in detail below. The preliminary POI determination module 420 may access the storage 150 or the storage medium to obtain the reference POI from the target POI database. The preliminary POI determination module 420 may select the reference POI from the target POI database as the preliminary POI based on the location pair. The reference POI may have one or more attributes, including a name of the reference POI (e.g., Peking University, Peking Union Medical College Hospital), a category of the reference POI (e.g., a school, a hospital, a gate, a transportation station, a shop, etc.), an address (e.g., No. 9 Xuesen Road, Gaoxin District, Suzhou), coordinates (e.g., latitude coordinate and longitude coordinate), a zip code (e.g., 100000), a description, or the like, or the combination thereof. In some embodiment, preliminary POI determination module 420 may determine the one or more POI which are within a first distance (e.g., 100 meters) from the current location and within a second distance (e.g., 80 meters) from the pickup location.

The feature extraction module 430 may determine one or more features of the one or more preliminary POIs. In some embodiments, the one or more feature of the one or more preliminary POIs may be generated in advance, and stored in a storage device (e.g., the storage 150). The feature extraction module 430 may obtain the one or more reference features of the one or more preliminary POI from the storage 150. In some embodiments, the one or more features of the preliminary POI may include an attribute feature of the first preliminary POI (such as a bus station, a crossroad, etc.), a distance feature representing a distance between the pickup location and the first preliminary POI, a historical order amount feature (e.g., number of historical orders that using the first preliminary POI as the pickup location), a relocation behavior feature of historical orders, or the like, or any combination thereof.

The model obtaining module 440 may obtain a trained naming model for naming the pickup location. The model obtaining module 440 may determine a score for the preliminary POI based on the feature of the preliminary POI and the trained naming module for naming the pickup location. In some embodiments, the model obtaining module 440 may train the naming model for naming the pickup location based on a plurality of training samples.

The naming module 450 may determine a name of the pickup location. For example, the naming module 450 may determine the name of the pickup location based on a trained naming module.

The location obtaining module 410, the preliminary POI determination module 420, the feature extraction module 430, the model obtaining module 440, and the naming module 450 in the processing engine 112 may be connected to or communicate with each other via a wired connection, a wireless connection, or any combination thereof. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the location obtaining module 410, the preliminary POI determination module 420, the feature extraction module 430, the model obtaining module 440, and the naming module 450 may be combined as a single module. For example, the model obtaining module 440 may be integrated with the naming module 450 as a single module. The single module may determine name of a pickup location based on the trained name model.

Figure 4B:
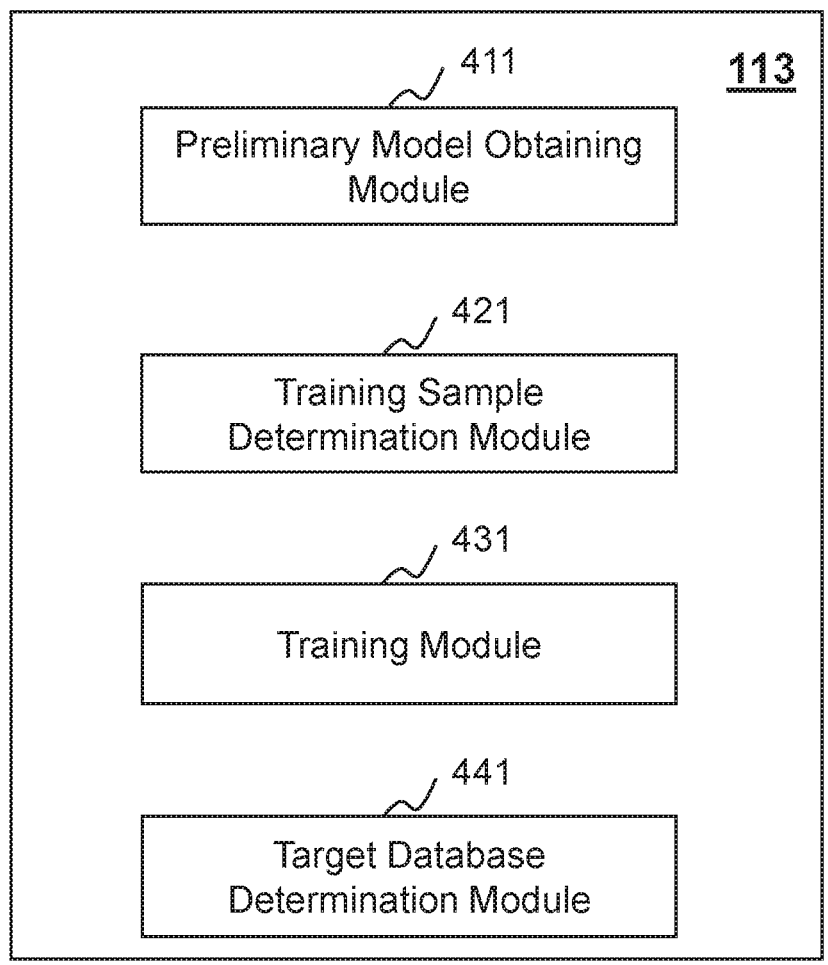
FIG. 4B is a block diagram of an exemplary processing engine for determining a trained naming model according to some embodiments of the present disclosure.

FIG. 4B is a block diagram of an exemplary processing engine 113 for determining a trained naming model according to some embodiments of the present disclosure. The processing engine 113 may be in communication with a computer-readable storage (e.g., a storage 150, a requester terminal 130, or a provider terminal 140), and may execute instructions stored in the computer-readable storage medium. In some embodiments, the processing engine 113 may include a preliminary model obtaining module 411, a training sample determination module 421, a training module 431, and a target database determination module 441.

The preliminary model obtaining module 411 may obtain a preliminary naming model. In some embodiments, the preliminary naming model may include one or more classifiers. Each of the classifiers may have an initial parameter related to weight of the classifier.

The training sample determination module 421 may determine a plurality of training samples. In some embodiments, the training sample determination module 421 may determine one or more reference features of the reference POI, and the training sample determination module 421 may store the one or more reference features of the reference POI in the storage 150.

Training module 431 may determine a trained naming model by training the preliminary naming model based on each of the plurality of training samples. In some embodiments, the training module 431 may store the trained naming model in the storage 150.

The target database determination module 441 may determine a target POI database based on a preliminary POI database. In some embodiments, the target database determination module 441 may access a preliminary POI database in the storage 150. In some embodiments, the target database determination module 441 may store the target POI database in the storage 150.

The preliminary model obtaining module 411, the training sample determination module 421, the training module 431, and the target database determination module 441 in the processing engine 113 may be connected to or communicate with each other via a wired connection, a wireless connection, or any combination thereof. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof.

In some embodiments, the location obtaining module 410 may obtain a location pair. The location pair may include a current location and a pickup location. The current location may be a location where the user initiates the order via the requester terminal 130. In some embodiments, the current location may include longitude data and/or latitude data of the current location. In some embodiments, the current location may be the location of the requester terminal 130 when the user initiates the order via the requester terminal 130.

The preliminary POI determination module 420 may determine one or more preliminary points of interest (POIs) (e.g., a first preliminary POI and a second preliminary POI) based on the location pair and a target POI database. In some embodiments, the target POI database may be generated according to process 900 illustrated in FIG. 9 and described in detail below. In some embodiment, the preliminary POI determination module 420 may determine a first preliminary POI and a second preliminary POI that are within a first distance (e.g., 100 meters) from the current location and within a second distance (e.g., 80 meters) from the pickup location.

The feature extraction module 430 may determine a feature of the first preliminary POI based on the first preliminary POI and the location pair. For example, the feature extraction module 430 may determine the feature of the first preliminary POI based on the distance between the pickup location and the first preliminary POI. Merely by way of example, the feature may include an attribute feature of the first preliminary POI (such as a bus station, a crossroad, etc.), a distance feature representing a distance between the pickup location and the first preliminary POI, a historical order amount feature (e.g., number of historical orders that using the first preliminary POI as the pickup location), a relocation behavior feature of historical orders, or the like, or any combination thereof. In some embodiments, the feature extraction module 430 may obtain one or more reference features of the reference POI determined from the storage 150 as the feature of the first preliminary POI.

The feature extraction module 430 may determine a feature of the second preliminary POI based on the second preliminary POI and the location pair. For example, the feature extraction module 430 may determine the feature of the second preliminary POI based on the distance between the pickup location and the second preliminary POI. In some embodiments, the feature extraction module 430 may obtain one or more reference features of the reference POI from the storage 150 as the feature of the second preliminary POI.

The model obtaining module 440 may obtain a trained naming model for naming a pickup location. The trained naming model for naming the pickup location may include a machine learning model. In some embodiments, the trained naming model may include one or more classifiers. Each of the classifiers may have a trained parameter related to the weight of the classifier. The trained naming module may use the location pair and the feature of the preliminary POI as the input and generate a score for the preliminary POI as the output of the trained naming module based on the one or more classifiers and trained parameters related the weight of the classifiers.

The trained naming model for naming the pickup location may be generated and/or trained in advance, and stored in a storage device (e.g., the storage 150). The processor 220 may obtain the trained naming model from the storage device. Alternatively or additionally, the trained naming model for naming the pickup location can be trained and/or updated in the real time.

The trained naming model for naming the pickup location may be trained using one or more machine learning techniques. In some embodiments, the trained naming model may include a Ranking Support Vector Machine (SVM) model, a Gradient Boosting Decision Tree (GBDT) model, a LambdaMART model, an adaptive boosting model, a recurrent neural network model, a convolutional network model, a hidden Markov model, a perceptron neural network model, a Hopfield network model, a self-organizing map (SOM), or a learning vector quantization (LVQ), or the like, or any combination thereof. The recurrent neural network model may include a long short term memory (LSTM) neural network model, a hierarchical recurrent neural network model, a bi-direction recurrent neural network model, a second-order recurrent neural network model, a fully recurrent network model, an echo state network model, a multiple timescales recurrent neural network (MTRNN) model, etc.

In some embodiments, the trained naming model may be generated by performing one or more operations described in connection with FIG. 6.

The model obtaining module 440 may determine a first score for the first preliminary POI based on the feature of the first preliminary POI and the trained naming model. The model obtaining module 440 may use the location pair and the feature of the first preliminary POI as the input of the trained naming model, and determine a first score for the first preliminary POI as the output of the trained naming model. For example, the model obtaining 440 may determine the location pair and the feature of the first preliminary POI as the input of the trained naming model. The one or more classifiers may generate a first score to the first preliminary POI as the output of the trained naming model based on the location pair and the feature of the first preliminary POI.

The model obtaining module 440 may determine a second score for the second preliminary POI based on the feature of the second preliminary POI and the trained naming model. The model obtaining module 440 may use the location pair and the feature of the second preliminary POI as the input, and determine a second score for second preliminary POI as the output of the trained naming model. For example, the model obtaining module 440 may determine the location pair and the feature of the second preliminary POI as the input of the trained naming model. The one or more classifiers may generate a second score to the second preliminary POI as the output of the trained naming model based on the location pair and the feature of the second preliminary POI.

The naming module 450 may determine a final POI based on the first score and the second score. The naming module 450 may rank the first preliminary POI and the second preliminary POI based on the first score and the second score. The naming module 450 may also determine a final POI based on the rank. For example, the naming module 450 may compare the first score and the second score, and determine the preliminary POI with the higher score as the final POI.

The naming module 450 may determine a name of the pickup location based on the final POI. For example, the naming module 450 may obtain the name of the final POI (e.g., based on the information related to the final POI obtained from the target POI database) and assign the name of the final POI to the name of the pickup location.

In some embodiments, the preliminary model obtaining module 411 may obtain a preliminary naming model. In some embodiments, the preliminary naming model may include one or more classifiers. Each of the classifiers may have an initial parameter related to the weight of the classifier.

The preliminary naming model may include a Ranking Support Vector Machine (SVM) model, a Gradient Boosting Decision Tree (GBDT) model, a LambdaMART model, an adaptive boosting model, a recurrent neural network model, a convolutional network model, a hidden Markov model, a perceptron neural network model, a Hopfield network model, a self-organizing map (SOM), or a learning vector quantization (LVQ), or the like, or any combination thereof. The recurrent neural network model may include a long short term memory (LSTM) neural network model, a hierarchical recurrent neural network model, a bi-direction recurrent neural network model, a second-order recurrent neural network model, a fully recurrent network model, an echo state network model, a multiple timescales recurrent neural network (MTRNN) model, etc.

The training sample determination module 421 may determine a plurality of training samples. The plurality of training samples may include one or more reference features of the reference POI and an annotation pair of the historical order mapped with the reference POI. The annotation pair may include historical location data, historical final pickup location data, and historical pickup location name of the historical order mapped with the reference POI. In some embodiments, the plurality of training samples may include positive samples and/or negative samples. Besides, the training sample determination module 421 may determine whether a training sample is a positive sample or a negative sample. In some embodiments, at least one of the plurality of training samples may be generated according process 700 illustrated in FIG. 7 and described below.

The training module 431 may determine the trained naming model by training the preliminary naming model with the plurality of training samples. The preliminary naming model may take the plurality of training samples as the input and determine one or more actual scores for one or more reference POIs as the actual output based on the one or more classifiers. The reference POIs may have one or more attributes, including a name of the reference POI (e.g., Peking University, Peking Union Medical College Hospital), a category of the reference POI (e.g., a school, a hospital, a gate, a transportation station, a shop, etc.), an address (e.g., No. 9 Xuesen Road, Gaoxin District, Suzhou), coordinates (e.g., latitude coordinate and longitude coordinate), a zip code (e.g., 100000), a description, or the like, or the combination thereof. Each of the one or more classifiers may have an initial parameter related to the weight of the classifier. The initial parameter related to the weight of the classifier may be adjusted based on the positive and/or the negative samples.

The training module 431 may determine a desired output based on the plurality of training samples. In some embodiments, the desired output of a training sample may be the historical pickup location name of the historical order mapped with the reference POI. The training module 431 may train the preliminary naming model to minimize a loss function. The loss function may indicate a difference between the desired output and the actual output determined by the preliminary naming model. A training sample may have an actual score of the actual output and a desired score of the desired output. The actual score and the desired score may be the same or different. The loss function may be a sum of the absolute differences between the actual score and the desired score for each of the training samples. Specifically, when the actual output is the same as the desired output, the loss function is 0. The minimization of the loss function may be iterative. The iteration of the minimization of the loss function may end when the value of the loss function is less than a predetermined threshold. The predetermined threshold may be set based on various factors, including a number of the training samples, the accuracy level of the model, etc. The training module 431 may iteratively adjust the initial parameters of the preliminary naming model during the minimization of the loss function. At the end of the minimization of the loss function, the training module 431 may determine more than one trained parameter and the trained naming model.

In some embodiments, the training sample determination module 421 may determine historical order information related to a historical order. In some embodiments, the server 110 may access the storage 150 and/or the storage medium (e.g., the ROM 230, the RAM 240) to obtain the historical order. The historical order information may include historical location data, historical final pickup location data, historical recommended pickup location data, a historical pickup location name, or the like, or a combination thereof. In some embodiments, the historical location data may include longitude data and/or latitude data of the historical location. The historical final pickup location data may include longitude data and/or latitude data of the historical final pickup location. The historical recommended pickup location data may include may include longitude data and/or latitude data of the historical recommended pickup location. The historical location may be a location of a requester terminal 130 where the user initiated the historical order via the requester terminal 130. The historical final pickup location may be a final location that the user chose to get on board via the requester terminal 130. The historical recommended pickup location may be a location generated by the on-demand service system 100 as a historical recommended pickup location related to the historical order. The historical pickup location name may be name of the historical final pickup location of the historical order.

The training sample determination module 421 may map the reference POI with the historical order information. The training sample determination module may access the storage 150 to obtain the reference POI from the target POI database. The reference POIs may have one or more attributes, including a name of the reference POI (e.g., Peking University, Peking Union Medical College Hospital), a category of the reference POI (e.g., a school, a hospital, a gate, a transportation station, a shop, etc.), an address (e.g., No. 9 Xuesen Road, Gaoxin District, Suzhou), coordinates (e.g., latitude coordinate and longitude coordinate), a zip code (e.g., 100000), a description, or the like, or the combination thereof. The training sample determination module 421 may map the reference POI with the historical order information based on an attribute of the reference POI. In some embodiments, the training sample determination module 421 may map the historical order information to the reference POI based on the similarity of the name of the reference POI and the historical pickup location name of the historical order. The similarity of the name may be indicated by the number of same words included in the reference POI and the historical pickup location name. For example, if the similarity of the name of the reference POI (for example, POI A) and the historical pickup location name of the historical order (for example, order A) exceeds 50%, the training sample determination module 421 may map POI A with the historical order information of order A.

The training sample determination module 421 may determine one or more reference features of the reference POI based on the historical order information mapped with the reference POI.

In some embodiments, the one or more reference features of the reference POI may include distance feature data representing a distance between the pickup location and the reference POI. The training sample determination module 421 may determine a distance (e.g., Euclidean distance) between the reference POI and the historical final pickup location of a historical order mapped with the reference POI, as the distance feature data of the reference POI.

In some embodiments, the one or more reference features of the reference POI may include historical order amount feature data. For example, the training sample determination module 421 may determine the number of historical orders in which the name of the reference POI was used as the historical pickup location name, as the historical order amount feature data of the reference POI.

In some embodiments, the one or more reference feature of the reference POI may include attribute feature data. For example, if the name of the reference POI contains certain word, such as "gate," "station," the training sample determination module 421 may extract the certain word as the attribute feature data. As another example, if the reference POI is a landmark, such as a sculpture, a shop (e.g., KFC™, McDonald's™), a bus station, a subway station, etc., the training sample determination module 421 may extract such attribute of the reference POI as the attribute feature data.

In some embodiments, the one or more reference features of the reference POI may include relocation behavior feature data. The relocation behavior may indicate that in a historical order, a user selected a reference POI, other than the historical recommended pickup location as the historical final pickup location. For example, for a historical order A, the historical recommended pickup location is location A, the historical final pickup location is B; thus the training sample determination module 421 may determine relocation behavior feature data for the POI mapped with the order A. The training sample determination module 421 may determine the relocation behavior feature data in accordance with operations described in connection with FIG. 8.

The training sample determination module 421 may generate a training sample based on one or more reference features of the reference POI and the historical order information mapped with the reference POI. For example, the training sample may include the one or more reference features of the reference POI and an annotation pair of the historical order mapped with the reference POI. The annotation pair may include the historical location data, the historical final pickup location data, and the historical pickup location name of the historical order mapped with the reference POI. In some embodiments, in a training sample, the name of the reference POI and the historical pickup location name of the annotation pair may be the same, or with a similarity beyond a threshold (e.g., 50%).

In some embodiments, the training sample determination module 421 may determine whether a training sample is a positive sample or a negative sample based on the historical order amount feature. The training sample determination module 421 may determine a training sample with higher historical order amount feature as the positive sample, and determine a training sample with lower historical order amount feature as the negative sample. For example, there are three training samples, sample A, sample B, and sample C. The historical final pickup location of all the three training samples are the same, which means that different users chose different reference POIs as the historical pickup location names for same historical final pickup location. The historical order amount feature data of sample A is 9, and the historical order amount feature data of sample B is 3, and the historical order amount feature data of sample C is 2. The training sample determination module 421 may determine the sample A as the positive sample, and determine sample B and sample C as negative samples.

In some embodiments, the training sample determination module 421 may obtain historical final pickup location data. In some embodiments, the historical final pickup location data may include longitude and/or latitude information of the historical final pickup location, a link to the historical final pickup location, or the like, or any combination thereof. The historical final pickup location may refer to a pickup location that is finally used by a user in a historical order. In some embodiments, the historical final pickup location data may correspond to one or more historical orders of the same user. Alternatively or additionally, the historical final pickup location data may correspond to one or more historical orders of different users. The one or more historical orders may include all historical orders during a period. The period may be predetermined according to specific conditions, e.g., one week, one month, a quarter, half a year, a year.

The training sample determination module 421 may obtain historical recommended pickup location data. In some embodiments, the historical recommended pickup location data may include longitude and/or latitude information of the historical recommended pickup location, a link to the historical recommended pickup location, or the like, or any combination thereof. The historical recommended pickup location may refer to a pickup location recommended by the on-demand service system 100 corresponding to one or more historical orders. In some embodiments, for a historical order, the on-demand service system 100 may recommend one or more pickup locations to a user according to a historical location data of the user. For example, the historical location data of the user may include longitude and/or latitude information of the historical location.

The training sample determination module 421 may determine the relocation behavior feature data based on the historical final pickup location data and the historical recommended pickup location data. The training sample determination module 421 may compare the historical final pickup location data and the historical recommended pickup location data. If the historical final pickup location data and the historical recommended pickup location data are different (i.e., a user selected a reference POI, other than the historical recommended pickup location as the historical final pickup location), the training sample determination module 421 may determine the relocation behavior feature data for the reference POI. For example, the relocation behavior feature data may be "0," representing that in a historical order mapped with a reference POI, the historical final pickup location is the historical recommended pickup location. As another example, the relocation behavior feature data may be "1," representing that in a historical order mapped with a reference POI, the historical final pickup location is the reference POI instead of the historical recommended pickup location.

In some embodiments, the target database determination module 441 may obtain a preliminary POI database from the storage 150. The preliminary POI database may include a plurality of reference POIs. The plurality of reference POIs may be road intersections, bus stations, subway stations, scenic spots, schools, hospitals, hotels, shopping malls, or the like, or any combination thereof. The reference POI may have one or more attributes, including a name (e.g., Peking University, Peking Union Medical College Hospital), a category (e.g., school, firm, hospital, gate, transportation station, shop, road, etc.), an address (e.g., No. 9 Xuesen Road, Gaoxin District, Suzhou), coordinates (e.g., latitude coordinate and longitude coordinate), a zip code (e.g., 100000), a description, or the like, or the combination thereof.

The target database determination module 441 may determine the target POI database based on an attribute of the reference POI. In the event that not every reference POI in the preliminary POI database is suited for determining the name of the pickup location, one or more reference POIs in the preliminary POI database may be modified or deleted from the preliminary POI database. For example, some reference POI may be a company in a building that hosts a number of companies. As another example, some reference POI may be too general for the driver to find, such as a POI with the name of "Times Square," which do not show the exact position of the location. The target database determination module 441 may determine a target reference POI by deleting the reference POI of which name contains a certain word (e.g., "unit," "room," "hall," "department" "stairway," etc.) in the preliminary POI database. In some embodiments, the target database determination module 441 may determine a target reference POI by deleting the reference POI of which address is in a building. In some embodiments, the target database determination module 441 may determine a target reference POI by deleting the reference POI that belongs to a certain category (e.g., companies, roads).

Figure 5:
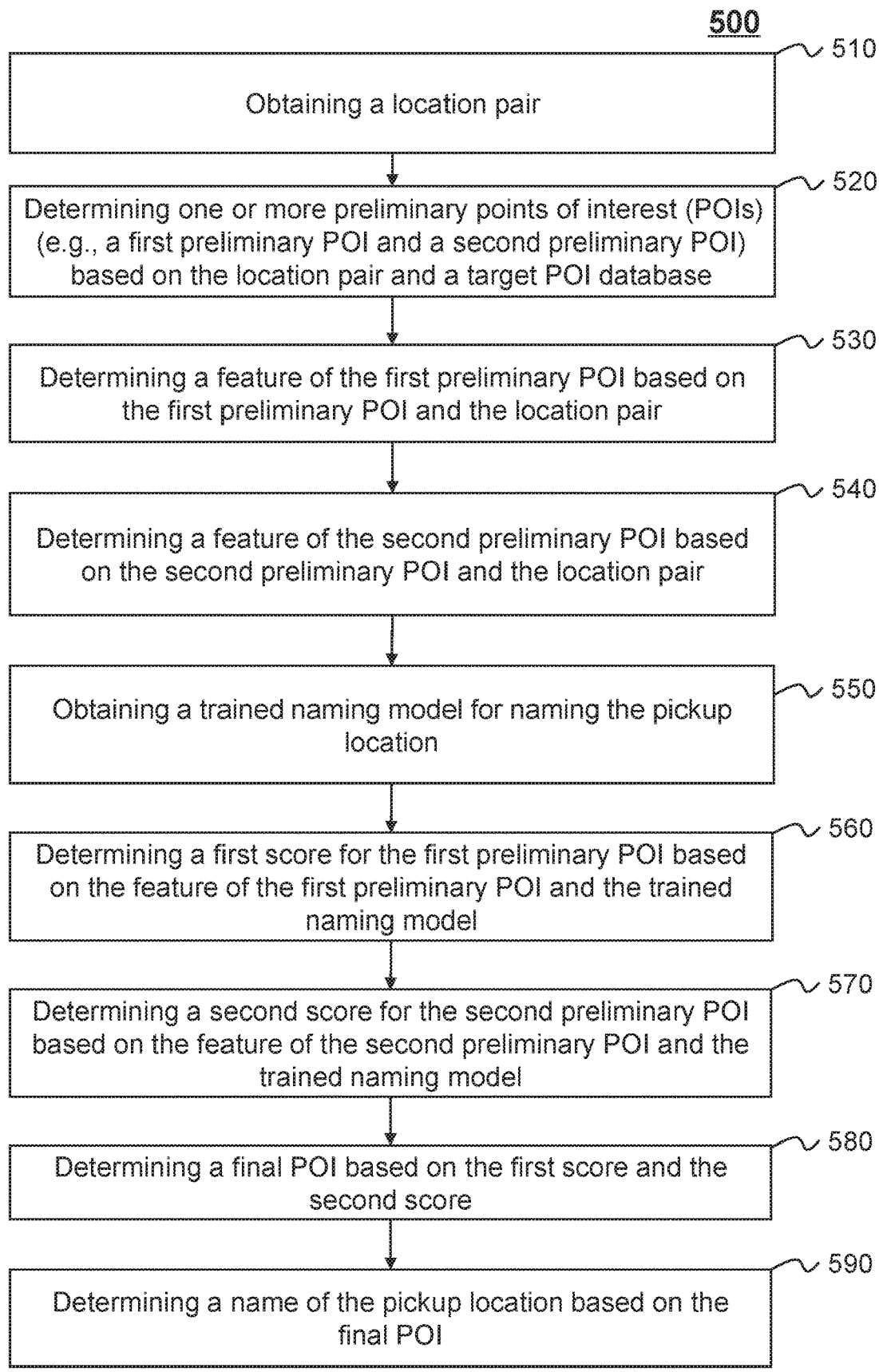
FIG. 5 is a flowchart of an exemplary process for determining a name of a pickup location according to some embodiments of the present disclosure.

FIG. 5 is a flowchart of an exemplary process 500 for determining a name of a pickup location according to some embodiments of the present disclosure. In some embodiments, the process 500 for determining the name of the pickup location may be implemented in the on-demand service system 100 as illustrated in FIG. 1. For example, the process 500 may be implemented as one or more sets of instructions stored in storage 150 and called and/or executed by the processing engine 112 or the processor 220. In some embodiments, the process 500 may be implemented in a user terminal and/or a server.

In 510, the location obtaining module 410 may obtain a location pair. The location pair may include a current location and a pickup location. The current location may be a location where the user initiates the order via the requester terminal 130. In some embodiments, the current location may include longitude data and/or latitude data of the current location. In some embodiments, the current location may be the location of the requester terminal 130 when the user initiates the order via the requester terminal 130.

The pickup location may be a location that the user wants to be picked up by the service provider. The pickup location may include longitude data and/or latitude data of the pickup location. In some embodiments, the pickup location may be determined by the on-demand service system 100 as a recommended pickup location, which may be transmitted to the requester terminal 130 and provider terminal 140. The on-demand service system 100 may determine the recommended pickup location by transmitting one or more historical pickup locations of one or more historical orders to the user. For example, the on-demand service system 100 may obtain one or more historical orders that are initiated at the location close to the user's current location and determine historical pickup location of the historical order as the recommended pickup location for the user. Alternatively, the pickup location may be inputted by the user via the requester terminal 130. Alternatively, the pickup location may the current location of the user described above.

In 520, the preliminary POI determination module 420 may determine one or more preliminary points of interest (POIs) (e.g., a first preliminary POI and a second preliminary POI) based on the location pair and a target POI database. In some embodiments, the target POI database may be generated according to process 900 illustrated in FIG. 9 and described in detail below. In some embodiment, the preliminary POI determination module 420 may determine a first preliminary POI and a second preliminary POI that are within a first distance (e.g., 100 meters) from the current location and within a second distance (e.g., 80 meters) from the pickup location.

In 530, the feature extraction module 430 may determine a feature of the first preliminary POI based on the first preliminary POI and the location pair. For example, the feature extraction module 430 may determine the feature of the first preliminary POI based on the distance between the pickup location and the first preliminary POI. Merely by way of example, the feature may include an attribute feature of the first preliminary POI (such as a bus station, a crossroad, etc.), a distance feature representing distance between the pickup location and the first preliminary POI, a historical order amount feature (e.g., number of historical orders that using the first preliminary POI as the pickup location), a relocation behavior feature of historical orders, or the like, or any combination thereof. In some embodiments, the feature extraction module 430 may obtain one or more reference features of the reference POI determined from the storage 150 as the feature of the first preliminary POI.

In 540, the feature extraction module 430 may determine a feature of the second preliminary POI based on the second preliminary POI and the location pair. For example, the feature extraction module 430 may determine the feature of the second preliminary POI based on the distance between the pickup location and the second preliminary POI. In some embodiments, the feature extraction module 430 may obtain one or more reference features of the reference POI from the storage 150 as the feature of the second preliminary POI.

In 550, the model obtaining module 440 may obtain a trained naming model for naming a pickup location. The trained naming model for naming the pickup location may include a machine learning model. In some embodiments, the trained naming model may include one or more classifiers. Each of the classifiers may have a trained parameter related to the weight of the classifier. The trained naming module may use the location pair and the feature of the preliminary POI as the input and generate a score for the preliminary POI as the output of the trained naming module based on the one or more classifiers and trained parameters related the weight of the classifiers.

In some embodiments, the trained naming model for naming the pickup location may be generated and/or trained in advance, and stored in a storage device (e.g., the storage 150). The processor 220 may obtain the trained naming model from the storage device. Alternatively or additionally, the trained naming model for naming the pickup location can be trained and/or updated in the real time.

The trained naming model for naming the pickup location may be trained using one or more machine learning techniques. In some embodiments, the trained naming model may include a Ranking Support Vector Machine (SVM) model, a Gradient Boosting Decision Tree (GBDT) model, a LambdaMART model, an adaptive boosting model, a recurrent neural network model, a convolutional network model, a hidden Markov model, a perceptron neural network model, a Hopfield network model, a self-organizing map (SOM), or a learning vector quantization (LVQ), or the like, or any combination thereof. The recurrent neural network model may include a long short term memory (LSTM) neural network model, a hierarchical recurrent neural network model, a bi-direction recurrent neural network model, a second-order recurrent neural network model, a fully recurrent network model, an echo state network model, a multiple timescales recurrent neural network (MTRNN) model, etc.

In some embodiments, the trained naming model may be generated by performing one or more operations described in connection with FIG. 6.

In 560, the model obtaining module 440 may determine a first score for the first preliminary POI based on the feature of the first preliminary POI and the trained naming model. The model obtaining module 440 may use the location pair and the feature of the first preliminary POI as the input of the trained naming model, and determine a first score for the first preliminary POI as the output of the trained naming model. For example, the model obtaining module 440 may determine the location pair and the feature of the first preliminary POI as the input of the trained naming model. The one or more classifiers may generate a first score to the first preliminary POI as the output of the trained naming model based on the location pair and the feature of the first preliminary POI.

In 570, the model obtaining module 440 may determine a second score for the second preliminary POI based on the feature of the second preliminary POI and the trained naming model. The model obtaining module 440 may use the location pair and the feature of the second preliminary POI as the input, and determine a second score for second preliminary POI as the output of the trained naming model. For example, the model obtaining module 440 may determine the location pair and the feature of the second preliminary POI as the input of the trained naming model. The one or more classifiers may generate a second score to the second preliminary POI as the output of the trained naming model based on the location pair and the feature of the second preliminary POI.

In 580, the naming module 450 may determine a final POI based on the first score and the second score. The naming module 450 may rank the first preliminary POI and the second preliminary POI based on the first score and the second score. The naming module 450 may also determine a final POI based on the rank. For example, the naming module 450 may compare the first score and the second score, and determine the preliminary POI with the higher score as the final POI.

In 590, the naming module 450 may determine a name of the pickup location based on the final POI. For example, the naming module 450 may obtain the name of the final POI (e.g., based on the information related to the final POI obtained from the target POI database) and assign the name of the final POI to the name of the pickup location.

The operations of the process 500 described herein are intended to be illustrative and not limiting. In some embodiments, the process 500 may be accomplished with one or more additional operations not described and/or without one or more of the operations discussed. For example, in 520, the preliminary POI determination module 420 may determine a third preliminary POI based on the location pair and a target POI database. After 540 and before 550, the feature extraction module 430 may determine a feature of the third preliminary POI based on the first preliminary POI and the location pair. After 570 and before 580, the model obtaining module 440 may determine a third score for the third preliminary POI based on the feature of the third preliminary POI and the trained naming model. At 580, the naming module 450 may determine a final POI based on the first score, the second score, and the third score (e.g., selecting the preliminary POI with the highest score). Additionally, the order in which the operations of the process 500 as illustrated in FIG. 5 and described below is not intended to be limiting. For example, the order of 530 and 540 may be reverse, and the order of 560 and 570 may be reverse.

Figure 6:
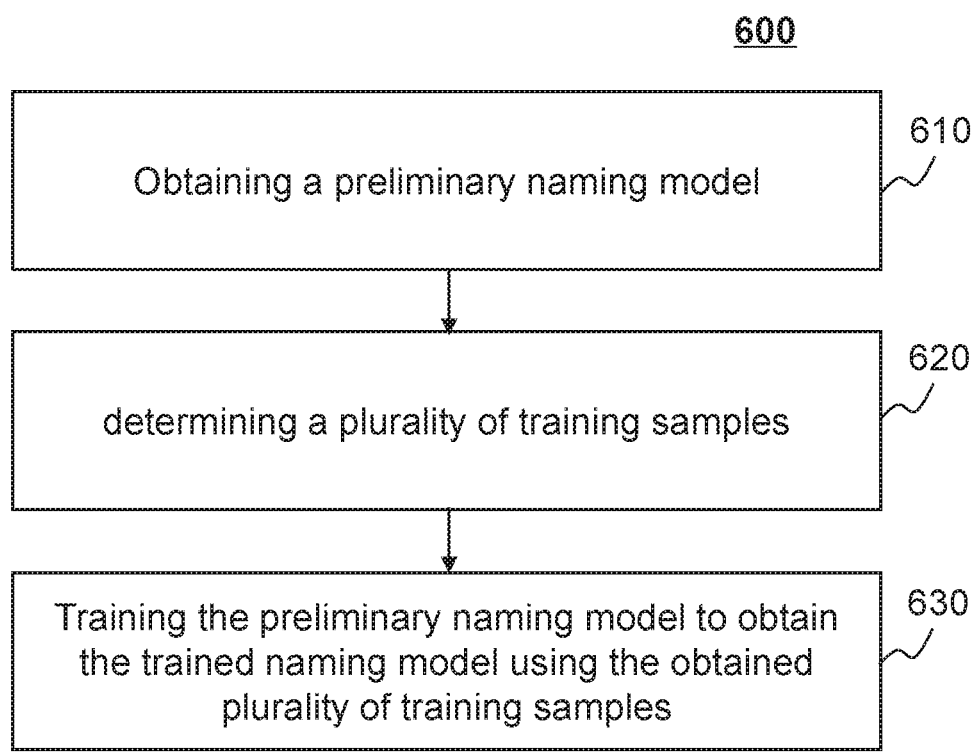
FIG. 6 is a flowchart of an exemplary process for determining a trained model for naming a pickup location according to some embodiments of the present disclosure.

FIG. 6 is a flowchart of an exemplary process 600 for determining a trained model for determining a trained naming model according to some embodiments of the present disclosure. In some embodiments, the process 600 for determining a trained naming model may be implemented in the on-demand service system 100 as illustrated in FIG. 1. For example, the process 600 may be implemented as one or more sets of instructions stored in storage 150 and called and/or executed by the processing engine 113 or the processor 220. Alternatively or additionally, the process 600 may be implemented in a user terminal and/or a server.

The operations of the illustrated process 600 described herein are intended to be illustrative and not limiting. In some embodiments, the process 600 may be accomplished with one or more additional operations not described, and/or without one or more of the operations discussed. Additionally, the order in which the operations of the process 600 as illustrated in FIG. 6 and described herein is not intended to be limiting.

In 610, the preliminary model obtaining module 411 may obtain a preliminary naming model. In some embodiments, the preliminary naming model may include one or more classifiers. Each of the classifiers may have an initial parameter related to the weight of the classifier.

The preliminary naming model may include a Ranking Support Vector Machine (SVM) model, a Gradient Boosting Decision Tree (GBDT) model, a LambdaMART model, an adaptive boosting model, a recurrent neural network model, a convolutional network model, a hidden Markov model, a perceptron neural network model, a Hopfield network model, a self-organizing map (SOM), or a learning vector quantization (LVQ), or the like, or any combination thereof. The recurrent neural network model may include a long short term memory (LSTM) neural network model, a hierarchical recurrent neural network model, a bi-direction recurrent neural network model, a second-order recurrent neural network model, a fully recurrent network model, an echo state network model, a multiple timescales recurrent neural network (MTRNN) model, etc.

In 620, the training sample determination module 421 may determine a plurality of training samples. The plurality of training samples may include one or more reference features of the reference POI and an annotation pair of the historical order mapped with the reference POI. The annotation pair may include historical location data, historical final pickup location data, and historical pickup location name of the historical order mapped with the reference POI. In some embodiments, the plurality of training samples may include positive samples and/or negative samples. Besides, the training sample determination module 421 may determine whether a training sample is a positive sample or a negative sample. In some embodiments, at least one of the plurality of training samples may be generated according process 700 illustrated in FIG. 7 and described below.

In 630, the training module 431 may determine the trained naming model by training the preliminary naming model with the plurality of training samples. The preliminary naming model may take the plurality of training samples as the input and determine one or more actual scores for one or more reference POIs as the actual output based on the one or more classifiers. The reference POIs may have one or more attributes, including a name of the reference POI (e.g., Peking University, Peking Union Medical College Hospital), a category of the reference POI (e.g., a school, a hospital, a gate, a transportation station, a shop, etc.), an address (e.g., No. 9 Xuesen Road, Gaoxin District, Suzhou), coordinates (e.g., latitude coordinate and longitude coordinate), a zip code (e.g., 100000), a description, or the like, or the combination thereof. Each of the one or more classifiers may have an initial parameter related to the weight of the classifier. The initial parameter related to the weight of the classifier may be adjusted based on the positive and/or the negative samples.

The training module 431 may determine a desired output based on the plurality of training samples. In some embodiments, the desired output of a training sample may be the historical pickup location name of the historical order mapped with the reference POI. The training module 431 may train the preliminary naming model to minimize a loss function. The loss function may indicate a difference between the desired output and the actual output determined by the preliminary naming model. A training sample may have an actual score of the actual output and a desired score of the desired output. The actual score and the desired score may be the same or different. The loss function may be a sum of the absolute differences between the actual score and the desired score for each of the training samples. Specifically, when the actual output is the same as the desired output, the loss function is 0. The minimization of the loss function may be iterative. The iteration of the minimization of the loss function may end when the value of the loss function is less than a predetermined threshold. The predetermined threshold may be set based on various factors, including a number of the training samples, the accuracy level of the model, etc. The training module 431 may iteratively adjust the initial parameters of the preliminary naming model during the minimization of the loss function. At the end of the minimization of the loss function, the training module 431 may determine more than one trained parameter and the trained naming model.

Figure 7:
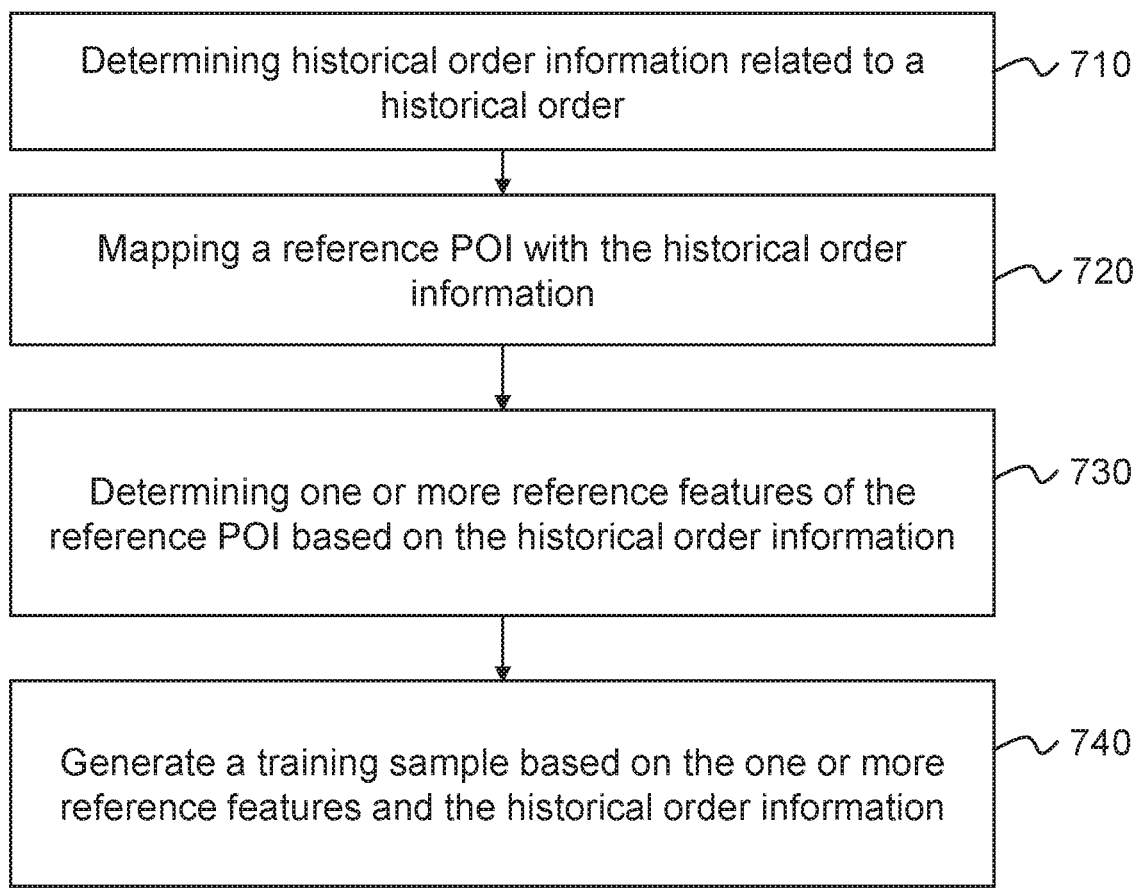
FIG. 7 is a flowchart of an exemplary process for determining a training sample according to some embodiments of the present disclosure.

FIG. 7 is a flowchart of an exemplary process 700 for determining a training sample according to some embodiments of the present disclosure. In some embodiments, the process 700 for determining a training sample may be implemented in the on-demand service system 100 as illustrated in FIG. 1. For example, the process 700 may be implemented as one or more sets of instructions stored in storage 150 and called and/or executed by the processing engine 113 or the processor 220. Alternatively or additionally, the process 700 may be implemented in a user terminal and/or a server. The operations of the illustrated process 700 described herein are intended to be illustrative and not limiting. In some embodiments, the process 700 may be accomplished with one or more additional operations not described, and/or without one or more of the operations discussed. Additionally, the order in which the operations of the process 700 as illustrated in FIG. 7 and described herein is not intended to be limiting.

In 710, the training sample determination module 421 may determine historical order information related to a historical order. In some embodiments, the server 110 may access the storage 150 and/or the storage medium (e.g., the ROM 230, the RAM 240) to obtain the historical order. The historical order information may include historical location data, historical final pickup location data, historical recommended pickup location data, a historical pickup location name, or the like, or a combination thereof. In some embodiments, the historical location data may include longitude data and/or latitude data of the historical location. The historical final pickup location data may include longitude data and/or latitude data of the historical final pickup location. The historical recommended pickup location data may include may include longitude data and/or latitude data of the historical recommended pickup location. The historical location may be a location of a requester terminal 130 where the user initiated the historical order via the requester terminal 130. The historical final pickup location may be a final location that the user chose to get on board via the requester terminal 130. The historical recommended pickup location may be a location generated by the on-demand service system 100 as a historical recommended pickup location related to the historical order. The historical pickup location name may be name of the historical final pickup location of the historical order.

In 720, the training sample determination module 421 may map the reference POI with the historical order information. The training sample determination module may access the storage 150 to obtain the reference POI from the target POI database. The reference POIs may have one or more attributes, including a name of the reference POI (e.g., Peking University, Peking Union Medical College Hospital), a category of the reference POI (e.g., a school, a hospital, a gate, a transportation station, a shop, etc.), an address (e.g., No. 9 Xuesen Road, Gaoxin District, Suzhou), coordinates (e.g., latitude coordinate and longitude coordinate), a zip code (e.g., 100000), a description, or the like, or the combination thereof. The training sample determination module 421 may map the reference POI with the historical order information based on an attribute of the reference POI. In some embodiments, the training sample determination module 421 may map the historical order information to the reference POI based on the similarity of the name of the reference POI and the historical pickup location name of the historical order. The similarity of the name may be indicated by the number of same words included in the reference POI and the historical pickup location name. For example, if the similarity of the name of the reference POI (for example, POI A) and the historical pickup location name of the historical order (for example, order A) exceeds 50%, the training sample determination module 421 may map POI A with the historical order information of order A.

In step 730, the training sample determination module 421 may determine one or more reference features of the reference POI based on the historical order information mapped with the reference POI.

In some embodiments, the one or more reference features of the reference POI may include distance feature data representing a distance between the pickup location and the reference POI. The training sample determination module 421 may determine a distance (e.g., Euclidean distance) between the reference POI and the historical final pickup location of a historical order mapped with the reference POI, as the distance feature data of the reference POI.

In some embodiments, the one or more reference features of the reference POI may include historical order amount feature data. For example, the training sample determination module 421 may determine the number of historical orders in which the name of the reference POI was used as the historical pickup location name, as the historical order amount feature data of the reference POI.

In some embodiments, the one or more reference feature of the reference POI may include attribute feature data. For example, if the name of the reference POI contains certain word, such as "gate," "station," the training sample determination module 421 may extract the certain word as the attribute feature data. As another example, if the reference POI is a landmark, such as a sculpture, a shop (e.g., KFC™, McDonald's), a bus station, a subway station, etc., the training sample determination module 421 may extract such attribute of the reference POI as the attribute feature data.

In some embodiments, the one or more reference features of the reference POI may include relocation behavior feature data. The relocation behavior may indicate that in a historical order, a user selected a reference POI, other than the historical recommended pickup location as the historical final pickup location. For example, for a historical order A, the historical recommended pickup location is location A, the historical final pickup location is B; thus the training sample determination module 421 may determine relocation behavior feature data for the POI mapped with the order A. The training sample determination module 421 may determine the relocation behavior feature data in accordance with operations described in connection with FIG. 8.

In 740, the training sample determination module 421 may generate a training sample based on one or more reference features of the reference POI and the historical order information mapped with the reference POI. For example, the training sample may include the one or more reference features of the reference POI and an annotation pair of the historical order mapped with the reference POI. The annotation pair may include the historical location data, the historical final pickup location data, and the historical pickup location name of the historical order mapped with the reference POI. In some embodiments, in a training sample, the name of the reference POI and the historical pickup location name of the annotation pair may be the same, or with a similarity beyond a threshold (e.g., 50%).

In some embodiments, the training sample determination module 421 may determine whether a training sample is a positive sample or a negative sample based on the historical order amount feature. The training sample determination module 421 may determine a training sample with higher historical order amount feature as the positive sample, and determine a training sample with lower historical order amount feature as the negative sample. For example, there are three training samples, sample A, sample B, and sample C. The historical final pickup location of all the three training samples are the same, which means that different users chose different reference POIs as the historical pickup location names for same historical final pickup location. The historical order amount feature data of sample A is 9, and the historical order amount feature data of sample B is 3, and the historical order amount feature data of sample C is 2. The training sample determination module 421 may determine the sample A as the positive sample, and determine sample B and sample C as negative samples.

Figure 8:
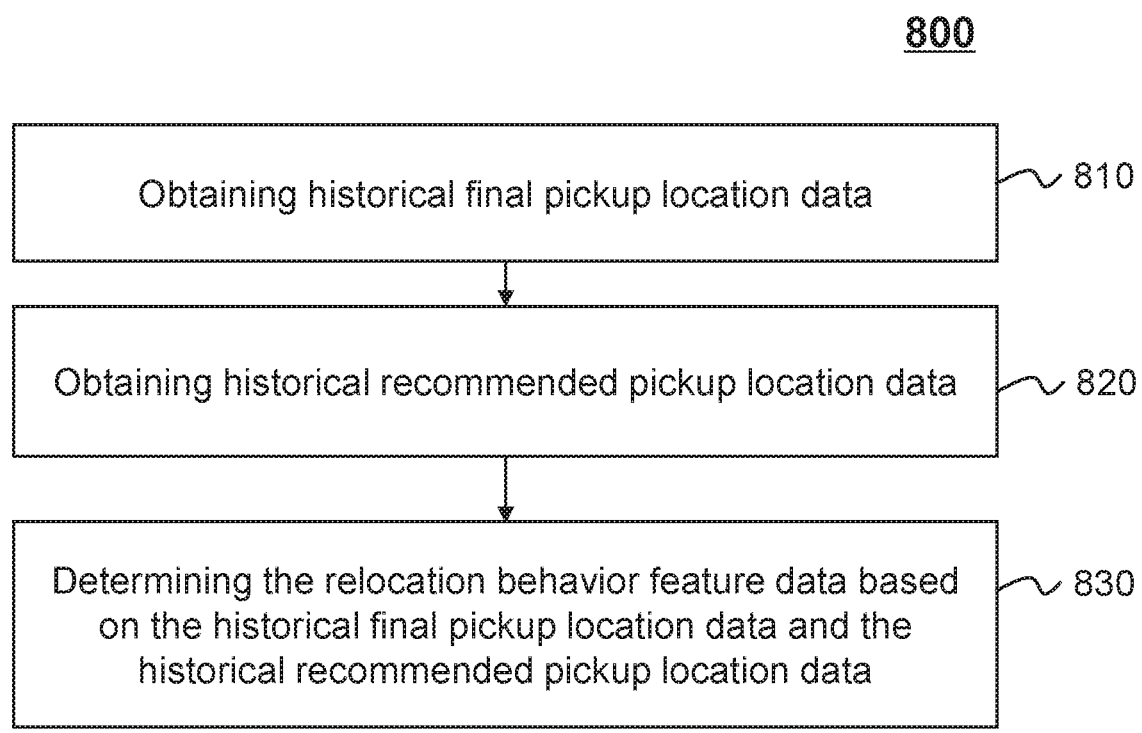
FIG. 8 is a flowchart of an exemplary process for determining a relocation behavior data according to some embodiments of the present disclosure; and, FIG. 9 is a flowchart of an exemplary process for determining a target POI database according to some embodiments of the present disclosure.

FIG. 8 is a flowchart of an exemplary process 800 for determining relocation behavior feature data according to some embodiments of the present disclosure. In some embodiments, the process 800 for determining relocation behavior feature data according to some embodiments of the present disclosure may be implemented in the on-demand service system 100 as illustrated in FIG. 1. For example, the process 800 may be implemented as one or more sets of instructions stored in storage 150 and called and/or executed by the processing engine 113. Alternatively or additionally, the process 800 may be implemented in a user terminal and/or a server.

The operations of the illustrated process 800 described herein are intended to be illustrative and not limiting. In some embodiments, the process 800 may be accomplished with one or more additional operations not described, and/or without one or more of the operations discussed. Additionally, the order in which the operations of the process 800 as illustrated in FIG. 8 and described herein is not intended to be limiting.

In 810, the training sample determination module 421 may obtain historical final pickup location data. In some embodiments, the historical final pickup location data may include longitude and/or latitude information of the historical final pickup location, a link to the historical final pickup location, or the like, or any combination thereof. The historical final pickup location may refer to a pickup location that is finally used by a user in a historical order. In some embodiments, the historical final pickup location data may correspond to one or more historical orders of the same user. Alternatively or additionally, the historical final pickup location data may correspond to one or more historical orders of different users. The one or more historical orders may include all historical orders during a period. The period may be predetermined according to specific conditions, e.g., one week, one month, a quarter, half a year, a year.

In 820, the training sample determination module 421 may obtain historical recommended pickup location data. In some embodiments, the historical recommended pickup location data may include longitude and/or latitude information of the historical recommended pickup location, a link to the historical recommended pickup location, or the like, or any combination thereof. The historical recommended pickup location may refer to a pickup location recommended by the on-demand service system 100 corresponding to one or more historical orders. In some embodiments, for a historical order, the on-demand service system 100 may recommend one or more pickup locations to a user according to a historical location data of the user. For example, the historical location data of the user may include longitude and/or latitude information of the historical location.

In 830, the training sample determination module 421 may determine the relocation behavior feature data based on the historical final pickup location data and the historical recommended pickup location data. The training sample determination module 421 may compare the historical final pickup location data and the historical recommended pickup location data. If the historical final pickup location data and the historical recommended pickup location data are different (i.e., a user selected a reference POI, other than the historical recommended pickup location as the historical final pickup location), the training sample determination module 421 may determine the relocation behavior feature data for the reference POI. For example, the relocation behavior feature data may be "0," representing that in a historical order mapped with a reference POI, the historical final pickup location is the historical recommended pickup location. As another example, the relocation behavior feature data may be "1," representing that in a historical order mapped with a reference POI, the historical final pickup location is the reference POI instead of the historical recommended pickup location.

Figure 9:
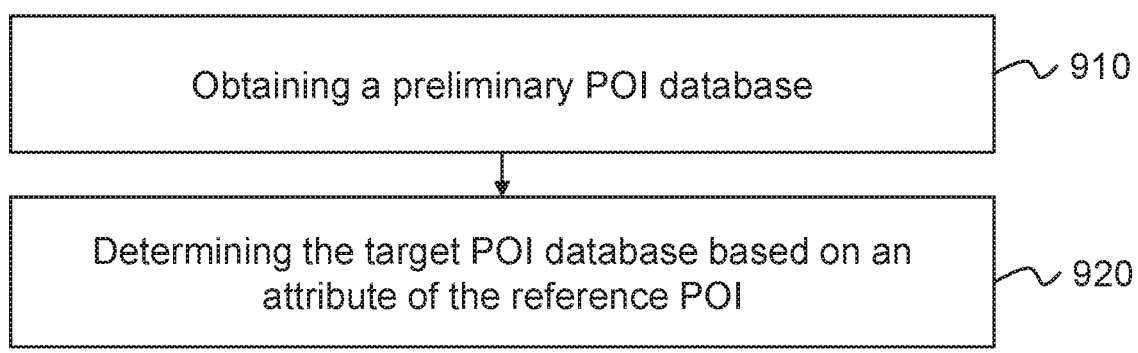

FIG. 9 is a flowchart of an exemplary process 900 for determining a target POI database according to some embodiments of the present disclosure. In some embodiments, the process 900 for determining a target POI database according to some embodiments of the present disclosure may be implemented in the on-demand service system 100 as illustrated in FIG. 1. For example, the process 900 may be implemented as one or more sets of instructions stored in storage 150 and called and/or executed by the processing engine 113 or the processor 220. Alternatively or additionally, the process 900 may be implemented in a user terminal and/or a server.

The operations of the illustrated process 900 described herein are intended to be illustrative and not limiting. In some embodiments, the process 900 may be accomplished with one or more additional operations not described, and/or without one or more of the operations discussed.

In 910, the target database determination module 441 may obtain a preliminary POI database from the storage 150. The preliminary POI database may include a plurality of reference POIs. The plurality of reference POIs may be road intersections, bus stations, subway stations, scenic spots, schools, hospitals, hotels, shopping malls, or the like, or any combination thereof. The reference POI may have one or more attributes, including a name (e.g., Peking University, Peking Union Medical College Hospital), a category (e.g., school, firm, hospital, gate, transportation station, shop, road, etc.), an address (e.g., No. 9 Xuesen Road, Gaoxin District, Suzhou), coordinates (e.g., latitude coordinate and longitude coordinate), a zip code (e.g., 100000), a description, or the like, or the combination thereof.

In 920, the target database determination module 441 may determine the target POI database based on an attribute of the reference POI. In the event that not every reference POI in the preliminary POI database is suited for determining the name of the pickup location, one or more reference POIs in the preliminary POI database may be modified or deleted from the preliminary POI database. For example, some reference POI may be a company in a building that hosts a number of companies. As another example, some reference POI may be too general for the driver to find, such as a POI with the name of "Times Square," which do not show the exact position of the location. The target database determination module 441 may determine a target reference POI by deleting the reference POI of which name contains a certain word (e.g., "unit," "room," "hall," "department" "stairway," etc.) in the preliminary POI database. In some embodiments, the target database determination module 441 may determine a target reference POI by deleting the reference POI of which address is in a building. In some embodiments, the target database determination module 441 may determine a target reference POI by deleting the reference POI that belongs to a certain category (e.g., companies, roads)

In some embodiments, the target database determination module 441 may determine the target POI database based, at least in part, on the historical order information. If a reference POI is the only POI in an area, the target database determination module 441 may keep the reference POI and determine the target reference POI database including such reference POI, even if the reference POI should be deleted based on the attribute.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system comprising:
    at least one storage device storing a set of instructions;
    at least one processor in communication with the at least one storage device, wherein when executing the set of instructions, the at least one processor is configured to cause the system to:
        operate logical circuits in the at least one processor to obtain a location pair associated with an order, the location pair including a current location and a pickup location;
        operate the logical circuits in the at least one processor to determine a first preliminary point of interest (POI) and a second preliminary POI based on the location pair and a target POI database;
        operate the logical circuits in the at least one processor to determine a feature of the first preliminary POI based on the first preliminary POI and the location pair;
        operate the logical circuits in the at least one processor to determine a feature of the second preliminary POI based on the second preliminary POI and the location pair;
        operate the logical circuits in the at least one processor to obtain a trained naming model for naming a pickup location, wherein the trained naming model is trained using a plurality of training samples, and wherein the plurality of training samples include at least one training sample that is generated according to a process for generating a training sample, the process comprising:
            determining historical order information related to a historical order;
            mapping a reference POI with the historical order information;
            determining a reference feature of the reference POI based on the historical order information; and,
            generating the at least one training sample based on the reference feature of the reference POI and the historical order information;
        operate the logical circuits in the at least one processor to determine a first score for the first preliminary POI based on the feature of the first preliminary POI and the trained naming model;
        operate the logical circuits in the at least one processor to determine a second score for the second preliminary POI based on the feature of the second preliminary POI and the trained naming model;
        operate the logical circuits in the at least one processor to determine a final POI based on the first score and the second score; and
        operate the logical in the at least one processor to determine a name of the pickup location based on the final POI.

2. The system of claim 1, wherein the first preliminary POI or the second preliminary POI is within a first distance from the current location and within a second distance from the pickup location.

3. The system of claim 1, wherein the trained naming model includes an adaptive boosting model or a gradient boosting decision tree (GBDT) model.

4. The system of claim 1, wherein the trained naming model is generated according to a process for training a naming model, the process comprising:
    obtaining a preliminary naming model;
    obtaining the plurality of training samples;
    training the preliminary naming model to obtain the trained naming model using the plurality of training samples.

5. The system of claim 1, wherein the historical order information includes at least one of historical location data, historical final pickup location data, historical recommended pickup location data, or a historical pickup location name.

6. The system of claim 1, wherein:
    the historical order information includes historical pickup location name; and
    the determining the reference feature of the reference POI further includes mapping the historical order information to the reference POI based on similarity of name of the reference POI and the historical pickup location name of the historical order.

7. The system of claim 1, wherein:
    the historical order information includes historical final pickup location data and historical recommended pickup location data;

the reference feature of the reference POI includes relocation behavior data; and the determining the reference feature of the reference POI based on the historical order information further includes:

obtaining the historical final pickup location data;

obtaining the historical recommended pickup location data; and determining the relocation behavior data based on the historical final pickup location data and the historical recommended pickup location data.

8. The system of claim 1, wherein the target POI database is determined based on a process for generating a POI database, the process comprising:

obtaining a preliminary POI database, the preliminary POI database including the reference POI; and determining the target POI database based on an attribute of the reference POI.

9. The system of claim 8, wherein determining the target POI database based on an attribute of the reference POI further includes:

determining the target POI database based on the historical order information.

10. A method implemented on a computing device having a processor, a storage medium and a communication platform connected to a network, the method comprising:

obtaining, by the processor, a location pair associated with an order, the location pair including a current location and a pickup location;

determining, by the processor, a first preliminary point of interest (POI) and a second preliminary POI based on the location pair and a target POI database;

determining, by the processor, a feature of the first preliminary POI based on the first preliminary POI and the location pair;

determining, by the processor, a feature of the second preliminary POI based on the second preliminary POI and the location pair;

obtaining, by the processor, a trained naming model for naming a pickup location;

determining, by the processor, a first score for the first preliminary POI based on the feature of the first preliminary POI and the trained naming model, wherein the trained naming model is trained using a plurality of training samples, and wherein the plurality of training samples include at least one training sample that is generated according to a process for generating a training sample, the process comprising:

determining historical order information related to a historical order;

mapping a reference POI with the historical order information;

determining a reference feature of the reference POI based on the historical order information; and, generating the at least one training sample based on the reference feature of the reference POI and the historical order information;

determining, by the processor, a second score for the second preliminary POI based on the feature of the second preliminary POI and the trained naming model;

determining, by the processor, a final POI based on the first score and the second score; and determining, by the processor, a name of the pickup location based on the final POI.

11. The method of claim 10, wherein the first preliminary POI or the second preliminary POI is within a first distance from the current location and within a second distance from the pickup location.

12. The method of claim 10, wherein the trained naming model includes an adaptive boosting model or a gradient boosting decision tree (GBDT) model.

13. The method of claim 10, wherein the trained naming model is generated according to a process for training a naming model, the process comprising:

obtaining a preliminary naming model;

obtaining the plurality of training samples;

training the preliminary naming model to obtain the trained naming model using the plurality of training samples.

14. The method of claim 10, wherein the historical order information includes at least one of historical location data, historical final pickup location data, historical recommended pickup location data, or a historical pickup location name.

15. The method of claim 10, wherein:

the historical order information includes a historical pickup location name; and the determining the reference feature of the reference POI further includes mapping the historical order information to the reference POI based on similarity of name of the reference POI and the historical pickup location name of the historical order.

16. The method of claim 10, wherein:

the historical order information includes historical final pickup location data and historical recommended pickup location data;

the reference feature of the reference POI includes relocation behavior data; and the determining the reference feature of the reference POI based on the historical order information further includes:

obtaining the historical final pickup location data;

obtaining the historical recommended pickup location data; and determining the relocation behavior data based on the historical final pickup location data and the historical recommended pickup location data.

17. The method of claim 10, wherein the target POI database is determined based on a process for generating a POI database, the process comprising:

obtaining a preliminary POI database, the preliminary POI database including the reference POI; and determining the target POI database based on an attribute of the reference POI.

18. A non-transitory computer readable medium, comprising at least one set of instructions for initiating a connection between a terminal and an on-demand transportation platform, wherein when executed by at least one processor of an electronic terminal, the at least one set of instructions directs the at least one processor to perform acts of:

obtaining a location pair associated with a user from a terminal, the location pair including a current location and a pickup location;

determining a first preliminary point of interest (POI) and a second preliminary POI based on the location pair and a target POI database;

determining a feature of the first preliminary POI based on the first preliminary POI and the location pair;

determining a feature of the second preliminary POI based on the second preliminary POI and the location pair;

obtaining a trained naming model for naming a pickup location, wherein the trained naming model is trained using a plurality of training samples, and wherein the plurality of training samples include at least one training sample that is generated according to a process for generating a training sample, the process comprising:
  determining historical order information related to a historical order;
  mapping a reference POI with the historical order information;
  determining a reference feature of the reference POI based on the historical order information; and,
  generating the at least one training sample based on the reference feature of the reference POI and the historical order information;
determining a first score for the first preliminary POI based on the feature of the first preliminary POI and the naming model;
determining a second score for the second preliminary POI based on the feature of the second preliminary POI and the naming model;
determining a final POI based on the first score and the second score; and
determining a name of the pickup location based on the final POI.

19. The non-transitory computer readable medium of claim 18, wherein:
  the historical order information includes historical pickup location name; and
  the determining the reference feature of the reference POI further includes mapping the historical order information to the reference POI based on similarity of name of the reference POI and the historical pickup location name of the historical order.

* * * * *